TRANSMISSION LINE PHASE MODULATOR

Filed Dec. 18, 1964

INVENTOR:
HENRY P. THOMAS,
BY I. David Blumenfeld
HIS ATTORNEY.

United States Patent Office 3,373,381
Patented Mar. 12, 1968

3,373,381
TRANSMISSION LINE PHASE MODULATOR

Henry P. Thomas, Lynchburg, Va., assignor to General Electric Company, a corporation of New York Filed Dec. 18, 1964, Ser. No. 420,251
6 Claims. (Cl. 332—29)

ABSTRACT OF THE DISCLOSURE

A phase modulator consisting of a transmission line which is terminated by an electrically variable impedance such as a diode. In the absence of a modulating signal, the diode terminates the line in its characteristic impedance $Z_0$. The line is made ⅛ of a wavelength long at the carrier frequency $F_c$. The modulating signal is impressed across the diode to vary the terminating impedance. This establishes standing waves on the transmission line and produces a reflected wave at the input of the line which is in quadrature with the carrier, the magnitude of the reflected signal being a function of the modulating signal to produce phase modulation.

This invention relates to an angular modulation system and, more particularly, to a phase modulator.

Angular modulation of a carrier wave, by varying either the phase or frequency, is effected in one type of presently available systems by varying a reactive element of a tuned circuit as a function of the modulating signal. The detuning of the resonant circuit, in response to the modulating signal, correspondingly varies the phase of the carrier frequency signal to produce a phase modulated carrier. While systems of this type are useful and effective in many areas, they have a tendency to be unstable, difficult to adjust, and hard to control with accuracy.

In other known phase modulating systems, the carrier is split into two quadrature components, and the quadrature components are varied in response to the modulating signal to produce phase modulation of the carrier. This system, while effective, is complex, complicated and costly. A need, therefore, exists for a phase modulation system which can produce the desired phase modulation by varying a resistive element to provide a system which is simple to adjust, inexpensive, highly stable in operation, and offers a high degree of linearity and accuracy.

It is a primary object of this invention to provide an angular modulation system which is simple in construction, stable in operation, and highly reliable.

A further object of this invention is to provide a phase modulation system which is simple in construction, reliable in operation, in which variations of a resistive device by the modulating signal produce phase modulation of a carrier signal.

Yet another object of this invention is to provide a modulator which produces phase modulation without varying the resonant frequency of a resonant structure but by varying a resistor element as a function of the modulating signal.

Other objects and advantages of the invention will become apparent as the description thereof proceeds.

The various objects and advantages of the instant invention are achieved by coupling a transmission line, such as a coaxial line or the like, to the carrier source output load. The transmission line is terminated by an electrically variable impedance, such as a diode, which, in the absence of a modulating signal, is equal to the characteristic impedance $Z_0$ of the transmission line so that carrier signals transmitted down the line are not reflected. A source of modulating signals is coupled to the diode thus varying the impedance terminating the transmission line as a function of the modulating signal to establish carrier signal reflections. The signal and magnitude of the reflected carrier signal varies with the direction and magnitude of the change of the line terminating impedance from the characteristic impedance $Z_0$. If the length of the transmission line is made one-eighth of a wave length at the carrier frequency $f_c$, the reflected carrier arrives at the input of the line and at the load ninety degrees (90°) after the original carrier. The reflected and original signals add in phase quadrature, thereby producing phase modulation of the carrier as a function of the modulating signal impressed on the line terminating diode.

The novel features, which are believed to be characteristic of this invention, are set forth, with particularity, in the appended claims. The invention itself, both as to its organization and method of operation, together with further objects and advantages thereof, may best be understood by reference to the following description taken in connection with the accompanying drawings in which:

Figure 1:
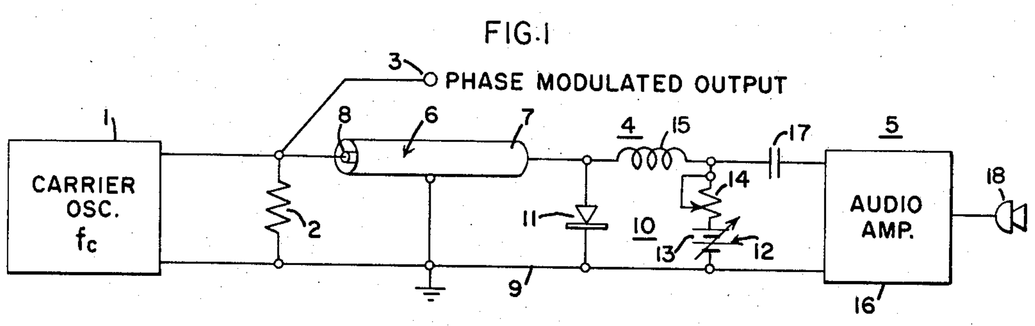
FIG. 1 is a block diagram of a phase modulator constructed in accordance with the instant invention.

FIG. 1 illustrates a phase modulator constructed in accordance with the instant invention wherein a carrier signal of frequency $f_c$ is phase modulated by means of an electrically variable resistance element coupled to a transmission line. Thus, a source of carrier frequency signals 1, which may be an oscillator or any other suitable source, impresses the carrier signal onto output impedance 2, shown for the sake of simplicity of illustration as a resistor. The phase modulated output, in a manner presently to be described, appears across an output resistor 2 and is applied from an output terminal 3 to any suitable utilization circuit. Also coupled across output load resistor 2 is a circuit, shown generally at 4, for adding a quadrature component to the original carrier signal. The quadrature component is varied in response to the modulating signals from a modulating signal source shown generally at 5.

The circuit for producing the varying quadrature component consists of a transmission line 6 which is shown to be a coaxial line having an outer conductor 7 and an inner conductor 8. The input of coaxial line 6 is connected across load resistor 2 with the outer conductor 7 connected to the lower end of load resistor 2 through grounded bus 9 and inner conductor to the upper end of load resistor 2. The coaxial cable is terminated in an electrically variable terminating impedance network 10 which includes a diode 11, a bias source 12, consisting of battery 13 and a variable resistor 14, and a high frequency choke 15. Battery 13 and resistor 14 provide a fixed bias which establishes the initial resistance of diode 11. The bias is so adjusted that, in the absence of a modulating signal, the resistance of diode 11 is equal to the characteristic impedance $Z_0$ of transmission line 6. With the resistance of diode 11 equal to $Z_0$, coaxial line 6 is perfectly terminated, and the carrier signal is dissipated across diode 11, and there is no reflected signal. In order to phase modulate the carrier, the modulating signal from source 5, which includes a source of audio intelligence, such as a microphone 18 and one or more audio amplifying stages 16, is coupled through a coupling capacitor 17 and choke 15 to diode 11. The modulating signal is impressed across diode 11 and varies its resistance thus varying the terminating impedance of the cable about the characteristic cable impedance $Z_0$. This introduces reflections of the carrier signal. The reflected signal arrives at the input of the coaxial line and across phase output resistance 2 is shifted ninety degrees (90°), and when added to the carrier signal produces a phase modulated signal.

High frequency choke 15, between diode 11 and audio amplifier 16, blocks the high frequency carrier signal from the audio amplifier stages while capacitor 17 blocks the DC voltage from battery 13.

Figure 2:
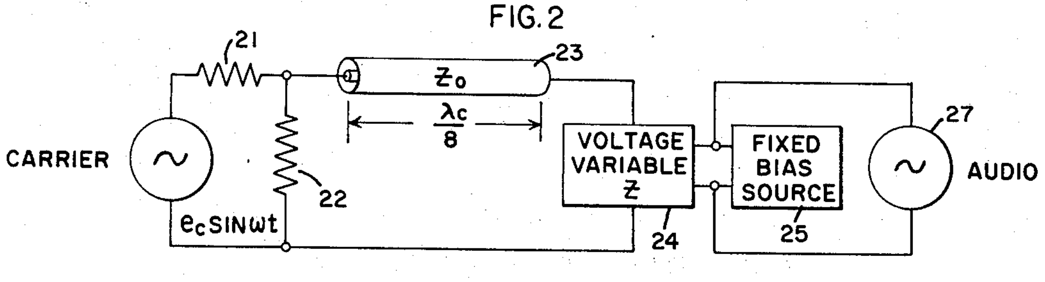
FIG. 2 is a schematic illustration of the equivalent electrical circuitry of the phase modulator of FIG. 1.
Figure 3:
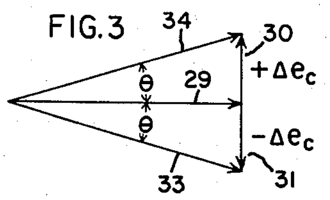
FIG. 3 is a vector diagram of the individual electrical signals useful in understanding the invention.

The manner in which the signal is phase modulated may be most easily understood from FIGS. 2 and 3. The source of carrier signals, $E=e_c\sin\omega t$, where $e_c$ is the peak amplitude of the sinusoidal carrier, is shown as the generator 20 the internal impedance of the source of carrier signals $Z_G$ bears the following relationship to the characteristic impedance $Z_0$ of the transmission line.

$$Z_G=\frac{Z_0}{2}$$

For simplicity of illustration, $Z_G$ is shown by means of resistor 21 and having an output load $Z_L=Z_0$. The coaxial line has a characteristic impedance $Z_0$, and its length is exactly one-eighth of the wave length at the center frequency $f_c$ of the carrier signal, i.e., $=\lambda c/8$. Connected to the output of coaxial line 23 is a voltage variable impedance 24 having a bias source 25 and a modulating signal source 27 coupled thereto. Bias voltage from source 25 adjusts the diode impedance so it is equal to the characteristic impedance $Z_0$ of coaxial line 23. Coaxial line 23 is, therefore, perfectly terminated, and any carrier frequency energy transmitted along that line is dissipated across voltage variable impedance 24. Coaxial line 23 is thus a nonresonant line, and there are no voltage and current standing waves and no reflections of the carrier signal to the input of the coaxial line $$\left(e=\frac{e_c}{2}\sin\omega t\right)$$

is present at the phase modulator output. The modulating signals superimposed on the fixed bias vary the cable terminating impedance so that it no longer equals $Z_0$. Since the cable is no longer terminated by $Z_0$ coaxial line 23 now becomes a resonant line and has voltage and current standing waves and a reflect carrier signal component appears. The magnitude and sign of the reflected carrier component depends on the direction and amount of the resistance variations from $Z_0$ which, in turn, is a function of the sign and magnitude of the modulating signal. The reflected carrier signal component travels back down coaxial cable 23 and arrives at output resistance 22 where it is added to the carrier signal from the source 20. Since coaxial line 23 is an eighth of a wave length long ($\lambda c/8$) it is apparent that the reflected signal component has travelled exactly a quarter wave length $\lambda c/4$ and arrives at the input of the cable exactly ninety degrees (90°) out of phase with the carrier signal. The reflected carrier signal is thus added in quadrature to the original carrier signal producing a resultant carrier signal which varies in phase as a function of the modulating signal. This may be seen most easily in FIG. 3 where the original carrier from source 20 is represented by the vector 29. The reflected carrier signal components at the input of the coaxial cable, $+\Delta e_c$ and $=\Delta e_c$, are represented by vectors 30 and 31. The sign of the reflected signal depends on whether the resistance is greater or less than $Z_0$ and the magnitude on the amplitude of the modulating signal. Hence, a phase modulated carrier, vectors 32 and 33, appears across output resistor 22, the phase $\theta$, of the modulated carrier varying as a function of the modulating signal.

The phase variation $\theta$ is, as will be explained by a brief and simple mathematical analysis, a function of the change in resistance of the terminating impedance from $Z_0$ and the sign as a function of the direction of that deviation.

The ratio of the reflected signal to the signal initially propagated down the cable is defined by:

$$\frac{E_{\text{Reverse}}}{E_{\text{Forward}}}=\frac{R-Z_0}{R+Z_0} \quad (1)$$

where $R$=the resistance of the diode cable terminating impedance.

$$\theta=\tan^{-1}\frac{E_{\text{Reverse}}}{E_{\text{Forward}}} \quad (2)$$

where $\theta$=the instantaneous phase deviation.

Substituting Equation 1 into Equation 2 results in:

$$\theta=\tan^{-1}\Big)\frac{R-Z_0}{R+Z_0} \quad (3)$$

For small changes in the cable terminating impedance R from $Z_0$ $$\frac{R-Z_0}{R+Z_0}\simeq\frac{R-Z_0}{Z_0}\simeq\frac{R}{Z_0}-1=\Delta \quad (4)$$

Therefore, $$\theta=\tan^{-1}\Delta \quad (5)$$

for small values of $$\theta=\cong\Delta \quad (6)$$

which means that the instantaneous phase deviation is proportional to the ratio of the magnitude of the departure of the terminating impedance from the character impedance to the characteristic impedance.

It will be apparent that a simple and effective circuit arrangement has been provided for phase modulating a carrier signal.

Although a number of specific embodiments of the invention have been shown, it will, of course, be understood that the invention is not limited thereto since many modifications, both in the instrumentalities and circuit arrangement employed, may be made. It is contemplated by the appended claims to cover any such modifications which fall within the true scope and spirit of this invention.

What is claimed as new and desired to be secured by Letters Patent of the United States is:

1. In a phase modulator, the combination comprising,
   (a) an output element;
   (b) means to impress a carrier wave on said output element;
   (c) a network coupled to said output element for producing, in response to a modulating signal, a quadrature carrier component across said output element to produce a phase modulated carrier wave, said network including
      (1) a transmission line, the input of said transmission line being coupled to said output element;
      (2) an electrically variable conductive device coupled across the output of said line;
      (3) means to impress a modulating signal across said conductive device so that standing waves are produced on said line in response to the modulating signal only and a reflected carrier wave component appears across the input of said line and said output element;
   (d) the electrical length of said line being such that the reflected carrier wave component is in quadrature with the carrier wave.

2. A phase modulator comprising,
   (a) an output element;
   (b) means to impress a carrier wave on said output element;
   (c) a network coupled to said output element for producing a quadrature carrier component in response to a modulating signal to be added to the carrier wave to produce a phase modulated carrier wave, said network including
      (1) a transmission line, the input of said transmission line being coupled to said output element;
      (2) an electrically variable impedance element coupled to said transmission line, said impedance element having a value equal to the characteristic impedance of said transmission line;

(3) means to impress a modulating signal on said impedance element to change the value of its impedance from the characteristic impedance to thereby produce standing waves on said transmission line and a reflected carrier wave component;

(d) the electrical length of said transmission line being such that the said reflected component is delayed by ninety electrical degrees to produce the said quadrature component.

3. A phase modulator, according to claim 1, wherein the conductive device coupled to the output of the transmission line is a diode, biasing means coupled to said diode to establish the resistance of said diode in the absence of a modulating signal at a value equal to the characteristic impedance of the transmission line.

4. The phase modulator, according to claim 1, wherein the electrical length of said line is one-eighth of the carrier wave length ($\lambda c/8$) so that the reflected carrier wave component is delayed by ninety degrees (90°).

5. A phase modulator, according to claim 4, wherein said transmission line is a coaxial cable.

6. In a phase modulator, the combination comprising, (a) a load impedance;

(b) means to impress a carrier wave across said load impedance;

(c) a coaxial cable having an input coupled to said load impedance, said cable being one-eighth of a wave length ($\lambda c/8$) long at the carrier wave frequency and having a predetermined characteristic impedance $Z_0$;

(d) a diode terminating impedance coupled to the output of said cable;

(e) a bias source coupled to said diode to control the conductivity of said diode and establish the impedance of said diode at a value equal to the characteristic impedance $Z_0$ of the cable so that there are no standing waves on said cable and there is no reflected carrier wave component;

(f) means to impress a modulating signal on said diode to vary its impedance so that it is no longer equal to $Z_0$, thereby establishing standing waves and producing a reflected carrier wave component across said load impedance which is in quadrature with the carrier wave to produce a phase modulated carrier wave.

References Cited

UNITED STATES PATENTS 2,434,904 1/1948 Busignies ---------- 332—27 X
3,191,130 6/1965 Rudd et al. --------- 332—29

ALFRED L. BRODY, *Primary Examiner.*